Aug. 7, 1934.   W. C. LAUGHLIN ET AL   1,969,022
APPARATUS FOR THE CLARIFICATION OF SEWAGE LIQUID
Filed Nov. 23, 1932   3 Sheets-Sheet 1

INVENTORS
William C. Laughlin
Abraham B. Asch
BY
C. P. Goepel
their ATTORNEY-

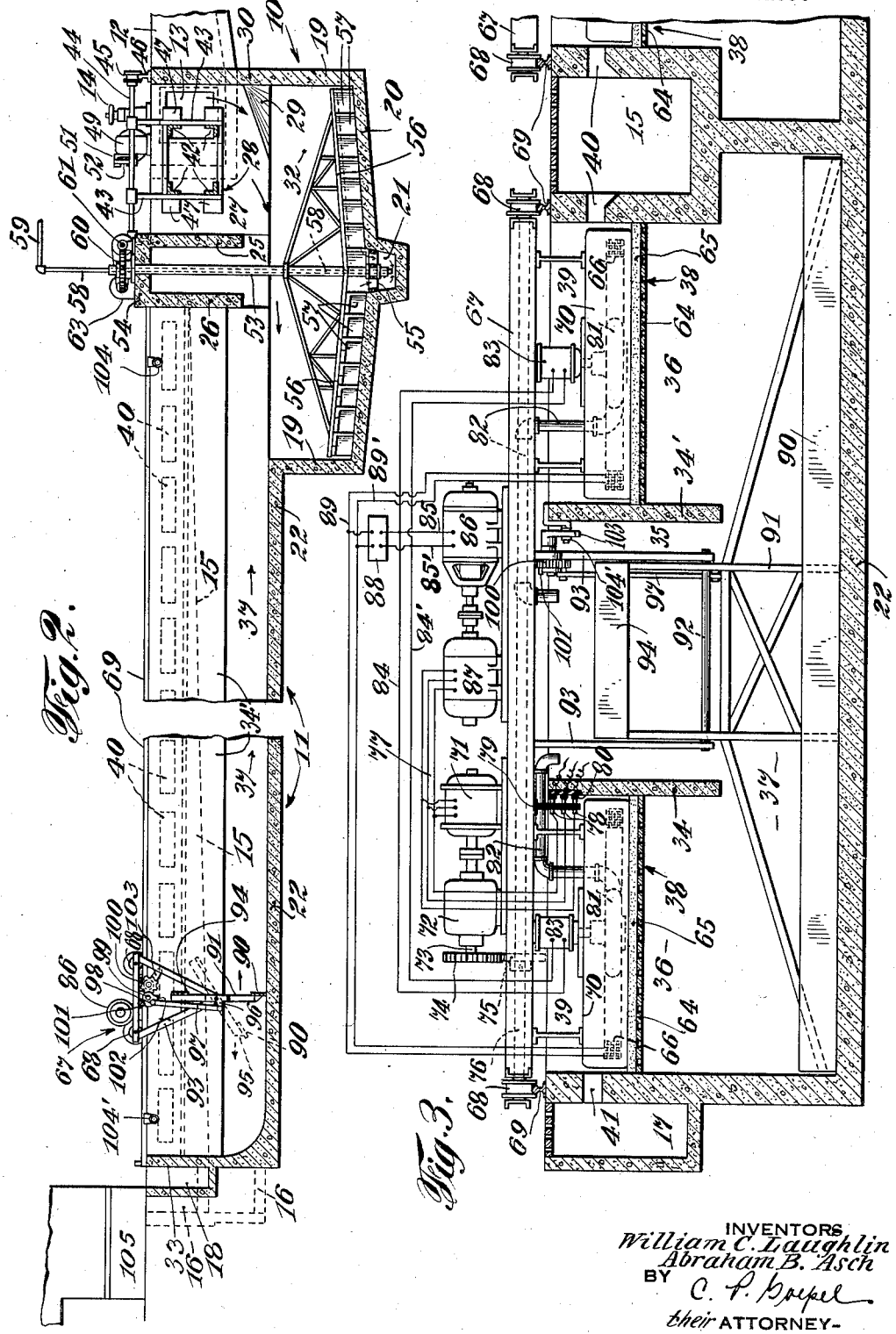

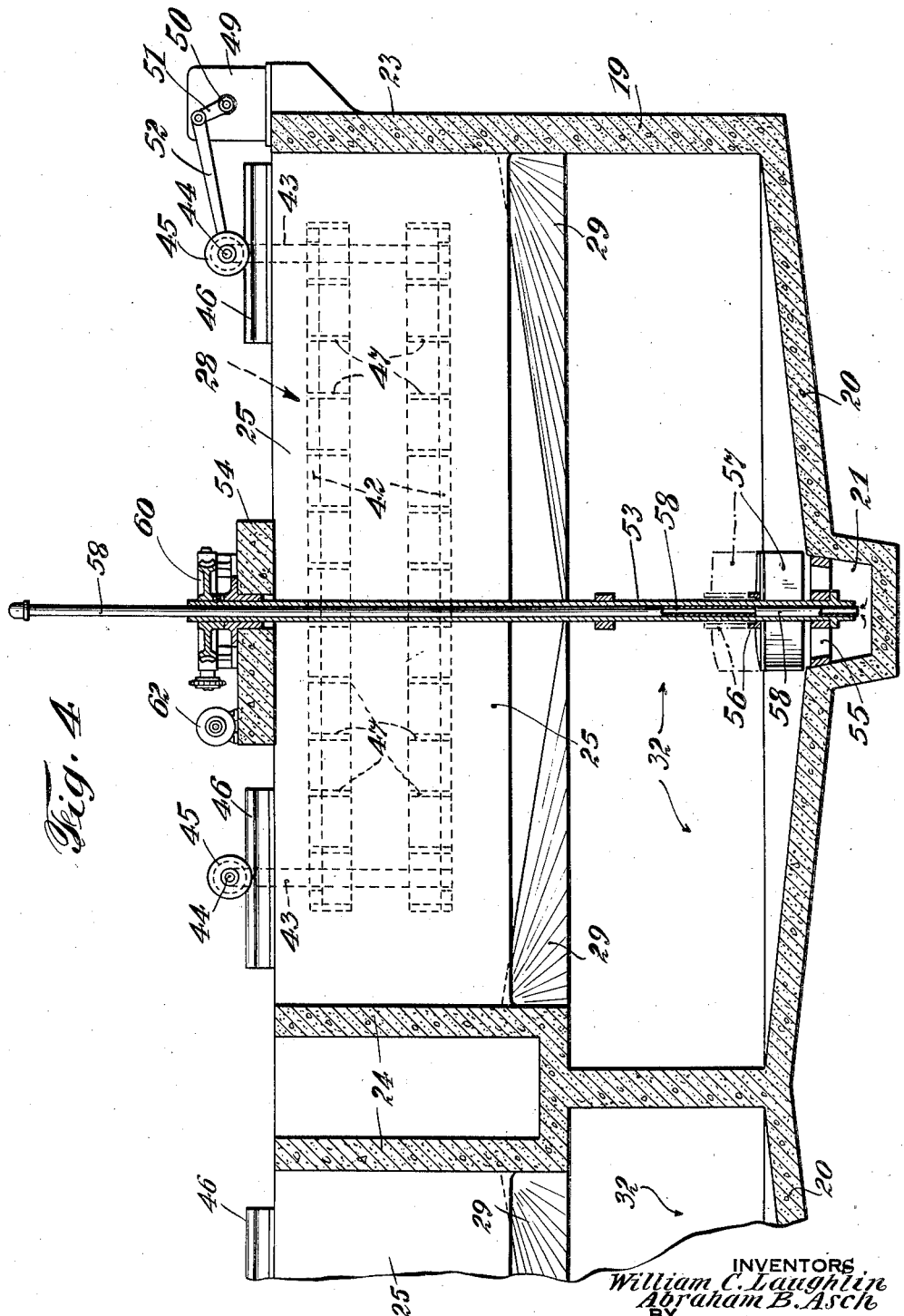

Patented Aug. 7, 1934

1,969,022

UNITED STATES PATENT OFFICE 1,969,022

APPARATUS FOR THE CLARIFICATION OF SEWAGE LIQUID

William C. Laughlin, Kew Gardens, and Abraham B. Asch, Brooklyn, N. Y., assignors, by mesne assignments, to Filtration Equipment Corporation, New York, N. Y., a corporation of Delaware Application November 23, 1932, Serial No. 644,019

10 Claims. (Cl. 210—2)

This invention relates to sewage treatment and more particularly to an improved method and apparatus for taking care of the continuous output of cities, municipalities, factories and the like, and for resolving the sewage liquid into a substantially clear effluent.

One of the objects of the invention is to resolve sewage liquid into an effluent which is substantially clear and which requires only the well-known chlorinated treatments in order to be properly conditioned for delivery into streams, lakes and the like, without contaminating the same and without afflicting the animal life contained in such waters.

The invention relates to a construction and arrangement of clarification apparatus of the fluid tidal pressure type by means of which the more or less solid colloidal matters in the sewage wastes are deposited and in which the sewage liquids are filtered in clean filter beds for the removal of the dirt, impurities and cloudy substances held in suspension thereby.

An object of the invention is to provide an apparatus of this class, in the manner as hereinafter set forth, with means for causing the sewage wastes immediately upon being admitted to the clarification tanks, to follow a course which will be conducive to a rapid deposit of the colloidal matter, thickening flux and slime, which have a higher specific gravity than the water. This work is carried out in reception tanks, and after it has been performed therein, the lighter sewage liquids and impurities pass into main clarification tanks containing elevated filter beds up through which the liquids are required to pass under fluid pressure.

The main clarification tanks may be extremely long and as the sewage liquids spread over the bottoms thereof and rise to the elevated filter beds, opportunity is again afforded for all thickening colloids and slime, which become heavier than water, to subside and settle out. By these steps and provisions, the sewage liquid is freed of practically all of its heavy matter prior to reaching a filter bed. In rising through a filter bed, the dirt, impurities and cloudy substances still remaining in the liquid are enmeshed and filtered out, so that the resulting effluent will be substantially clear and will require only chlorinated treatment in order to be fit and safe for delivery into a stream, lake or harbor.

In carrying forward the object of the invention, each filter bed is kept clean by a cleaning machine and the dirty water resulting from the cleaning operation is separated from the effluent and thereupon returned to the main tank for re-treatment. Also, in furtherance of the object, the settlings are not permitted to accumulate upon the bottoms, either of the main tank or of the reception tank. Suitable automatically operated scraper devices are provided for removing the settlings from the bottoms of these tanks; and in order to facilitate the removal operations in an orderly and expeditious manner, the bottom of each reception tank is provided at a lower level than the bottom of the associated main tank, so that the settlings of lighter character, which subside in each main tank, may be scraped onto the bottom of the associated reception tank for removal with the heavier and more abundant settlings.

The apparatus of our invention embodies certain principles of operation which are fundamentally more correct, for obtaining a substantially clear effluent, than in other known apparatus and systems, and the various instrumentalities thereof are capable of being adjusted or regulated as to speed and operation relatively to each other so as to control various features thereof, such as agitating the incoming sewage liquid, varying the rate of travel of the cleaning machines and the speed of the automatically operated scraping devices. The apparatus also provides for the use of coagulants for the rapid precipitation of solid material and for aiding in the clarification. Through these various provisions and others not specifically mentioned, the scale of operation can be varied as may be necessary in order to compensate for the wide variation which takes place in twenty-four hour periods in the sewage output of cities.

Although in the present embodiment of this invention, there is shown a duplex apparatus or unit comprising two reception tanks and two associated main clarification tanks, it is to be understood that a single unit of one reception tank and main tank can be employed, or that any number of units, whether single or duplex, can be employed, as this does not affect the principle of the invention.

The present invention will be more readily understood by referring to the following description in connection with the accompanying drawings, but the invention is not to be considered as limited thereby in any respect. The full scope of the invention will appear after an understanding of the illustrated embodiment and an appreciation of the advantages the invention produces therein.

It will be recognized that various additional objects not specifically enumerated above, are in contemplation for this invention and these will appear to those skilled in the art as the following description proceeds.

Referring now to the accompanying drawings, in which similar reference characters designate corresponding parts throughout the several views:—

Fig. 2 represents a longitudinal sectional view, taken on the line 2—2 of Fig. 1, looking in the direction of the arrows associated with said line;

Fig. 3 is a vertical cross sectional view on a larger scale, taken on the line 3—3 of Fig. 1, looking in the direction of the arrows associated with said line; and Fig. 4 is a vertical sectional view on a larger scale, taken on the line 4—4 of Fig. 1.

Figure 1:
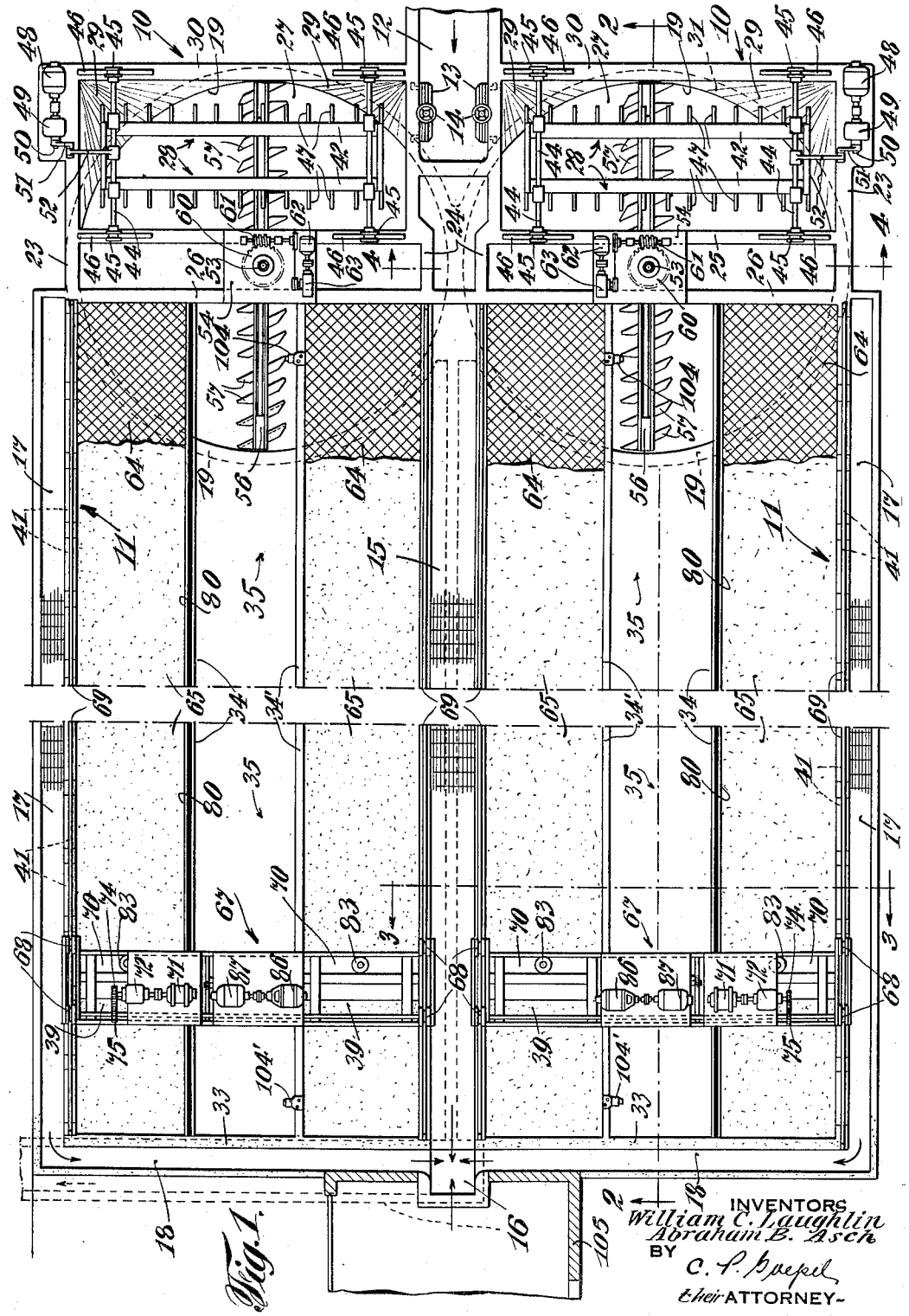
Figure 1 represents a fragmentary top plan view of a duplex unit embodying the present invention.

By referring now to the accompanying drawings, the structure in which we have illustrated a simple and practical example of our invention comprises two sets of tanks, each of which includes a reception tank 10 and a main tank 11 into which the sewage liquid under treatment passes from the reception tank. Each of these sets of tanks comprises a complete operative unit, and the specific manner in which, or by means of which, two sets of tanks, or more than two sets, are structurally joined or connected is not important. In practice, each set of tanks may be constructed either alone or in connection with any number of similar sets. However, it is characteristic for the purpose and object of our invention that each set should comprise a reception clarification tank 10 and a main clarification tank 11. These tanks may be constructed of any suitable material, and as herein illustrated the material is represented as comprising concrete.

In the present embodiment, wherein we have illustrated two sets of tanks constructed together, it will be seen that we provide an inlet conduit 12 through which the sewage liquid to be treated may be introduced into either one or both of the reception tanks 10, the said inlet conduit 12 being provided for each of the reception tanks 10 with a suitable inlet gate 13 by the adjustment of which the desired quantity of sewage liquid may be permitted to flow into these tanks. Each of these gates for its adjustment and regulation is provided with a hand-wheel 14. By means of these gates, the flow of incoming sewage may be regulated as desired in order properly and adequately to meet the conditions which may be involved in carrying out the sewage treatment, and as well in handling the changes which take place in the volume and character of the sewage in twenty-four hour periods. In the present embodiment, it will also be seen that the two main tanks 11, 11, which are of elongated rectangular form, extending in parallel relation, have between them a common clear liquor launder 15, which launder at the rear end thereof discharges into an outlet manifold 16. Extending along the outer side of each of these main tanks and for the full length thereof, is a clear liquor launder 17 which, at the rear end of each tank, empties into a rear transversely extending launder 18. The two launders 18 both discharge into the outlet manifold 16. It will be appreciated that the bottoms of all of these launders slope rearwardly so that their contents will flow rearwardly for discharge into the outlet manifold 16.

Inasmuch as the construction and arrangement of each of the two sets of tanks and as well the operative instrumentalities therewith associated, are substantially identical, a detailed description of one set of tanks together with the operative instrumentalities associated with it will suffice for both. From an inspection of Figs. 1, 2 and 4, it will be seen that the reception tank 10 is formed with a circular lower portion 19 the bottom 20 of which slopes inwardly all around from its circumferential wall to a central sump or cavity 21; and it will further be observed that the bottom 20 of this tank is situated well below the bottom 22 of the main tank 11. Extending diametrically across the upper portion of this tank from the outer wall 23 to the inner wall 24 are spaced parallel baffle walls 25 and 26. As illustrated in Fig. 2, these walls extend downwardly into the interior of the tank for a considerable distance. Forward of the baffle wall 25 the upper portion of this tank is of rectangular form for the purpose of providing a rectangular chamber 27 into which the sewage liquid is admitted through the gate 13 and in which is disposed for operation an agitator 28 for breaking up and uniformly distributing the solid materials contained in the incoming raw sewage liquid. Downwardly sloping bottom portions 29 are provided for the chamber 27 in the angular corners where the walls 23 and 24 join the front wall 30, these walls being located below the agitator 28 and sloping from the corners to a curved edge 31 for the purpose of directing the sewage liquid downwardly and into the circular chamber 32 within the circular portion 19 and below the baffle walls 25 and 26.

Extending lengthwise of the main tank 11 from the rear baffle wall 26 of the reception tank to the rear wall 33 of the main tank are spaced baffle walls 34, 34', which divide the main tank into a travel-way chamber 35 and two side chambers 36, 36, all being in open communication at their bottoms with the main chamber 37 adjacent the bottom wall 22 of the tank. At its forward end, said main chamber 37 is in open communication with the chamber 32 of the reception tank. Under this arrangement, the sewage liquid after passing underneath the baffles 26 and 25 flows into the chamber 37 of the main tank and after filling the same rises into the side chambers 36, 36 as well as into the travel-way 35. Each of the side chambers 36 is provided intermediate its height with a filter bed 38 which extends the entire length of the chamber from the baffle wall 26 in the reception tank to the rear wall 33 of the main tank. Through the provision of these filter beds, upper clear liquor chambers 39 are produced. Adjacent the launder 15, suitable spaced apart outlet openings 40, located well above the filter bed permit the clear liquor to flow from the adjacent chamber 39 into the launder 15; while at the other or outer side of the tank suitable spaced apart outlet openings 41 also located above the filter bed, permit the clear liquor to pass from the clear liquor chamber at that side of the tank into the launder 17.

It will be appreciated that in this arrangement the sewage liquid passes downwardly from the agitation chamber 27 into the main chamber 32 of the reception tank and thence proceeding rearwardly underneath the baffles 25 and 26, enters the chambers of the main tank which are filled to the point where the liquid rises through the filter beds for filtering thereby, and so that the clear liquor rising above the filter beds in the chambers 39, 39 will ultimately flow off into the clear liquor launders. It will be recognized that under this arrangement there will be a tidal or pressural flow from the inlet into the reception tank to the outlet openings through which the liquor passes into the clear liquor launders. At this point it may be mentioned that the outlet openings 40 and 41, in practice, may be equipped with weirs (not shown) or any similar devices adapted to be vertically adjusted so as to control the level at which the clear liquor will overflow into the clear liquor launders; and in this connection it will of course be recognized by those familiar with this art that regardless of the rate of tidal flow through the tanks from the point of admitting the sewage liquid to the points at which the clear liquor overflows into the launders, the overflow level may be controlled through the vertical adjustment of such weir devices.

At this point it may be remarked that within the reception tank and more particularly within the chamber 32 therein, the sewage liquid may be subjected to any suitable known or approved process of treatment adapted to gather, collect or coagulate the colloidal and suspended matter so that this sludge material, having a higher specific gravity than water, will settle downwardly to the bottom 20, while the lighter water and particles will flow upwardly through the open upper portion of the reception tank to fill the chambers in the main tank. An efficient process for causing the relatively heavy matter to subside upon the bottom 20 of the reception tank is described in United States Letters Patent No. 1,877,623, dated September 13, 1932, granted to William C. Laughlin. With the reception and main tank combination herein disclosed, it will be appreciated that the coagulation and deposit of matter, having a heavier specific gravity than water, will also occur in the chamber 37, which coagulated matter will be deposited upon the bottom 22 of this chamber. In other words, our reception and main tank combination provides opportunity during the tidal movement of the sewage liquid under treatment for the deposit at two different places of heavy or coagulated matter. By far the greater portion of the heavy matter contained in the sewage liquid subsides upon the bottom 20 of the reception tank, and the remaining heavy matter which is carried by the pressural flow into the long tank 11 and which when given longer time will condense and coagulate so as to become heavier than water, ultimately subsides upon the bottom 22. As the result of this arrangement, only the sediment and impurities having a specific gravity as light as water, rise with the flow to the filter beds where such sediment and impurities are enmeshed and entangled in the filtering material of the bed, so that only clear liquor rises from the beds into the chambers 39.

The agitator 28 may consist of any suitable or approved device for diffusing and mixing the treating chemicals with the solid matter contained in the incoming sewage. In the present embodiment, the agitator illustrated consists of a rectangular frame 42 suitably supported at or adjacent its opposite ends by members 43 depending from axles 44 which are equipped with wheels 45 adapted to turn on track rails 46, arranged upon the walls 25 and 30, as illustrated in Figs. 1 and 2. The rectangular frame 42 is equipped with spaced series of outwardly projecting vanes or wings 47. For actuating this agitator device any suitable means may be provided, that shown in the present embodiment comprising an electric motor 48 which operates suitable reduction gearing contained within a reduction gear box 49. To the shaft 50 driven by the reduction gearing is fixed a crank 51 and a rod 52 connects this crank with one of the axles 44. By this arrangement, upon the operation of the motor 48, the agitator is moved to and fro within the chamber 27.

Means are provided for scraping the settlings which are deposited upon the bottom 20, into the sump 21; and the device for this purpose comprises a hollow rotary shaft 53 suitably journaled at its top end in a platform 54 which connects the baffles 25 and 26, and at its lower end by a hollow bearing 55. To this shaft are connected oppositely extending beams 56 which carry obliquely inclined scraping shoes 37 adapted upon the rotation of the shaft to scrape rows or furrows of the settlings.

These scraping shoes, as best shown in Fig. 1, are arranged in angular and overlapping relation as to position so that the rows of scrapings will be moved by successive shoes inwardly toward and finally into the sump. The hollow shaft 53 contains a suction pipe 58 which is in open communication at its lower end with the interior of the sump whereby to withdraw the sludge which is scraped into the sump. This suction pipe protrudes from the upper end of the shaft 53 and is connected with a discharge line 59 for conducting the sludge to any suitable place of deposit. The shaft 53, for its operation, is provided adjacent its upper end with a gear 60 in mesh with a worm gear 61 which is driven from any suitable source of power as by an electric motor 62 and reduction gearing driven thereby and contained in a suitable reduction gear box 63.

Each of the filter beds 38 consists of a filter screen 64 upon which loosely reposes a bed of magnetite 65 or similar material adapted to be agitated by the intermittent operation of an electromagnet 66 carried by a traveling cleaning machine. By referring to Fig. 3, it will be observed that a similar cleaning machine is provided for operating upon each of the filter beds; and both of the cleaning machines depend from an overhead carriage 67 equipped at its opposite ends with track wheels 68 adapted to turn upon track rails 69 which are mounted upon the top edges of the longitudinal side walls defining the tank 11. This carriage travels back and forth along the length of the bed and the cleaning machines are carried thereby within the clear liquor chambers 39 so as to be moved adjacent the top surface of the magnetite. Each of the cleaning machines includes a tank 70 the hollow interior of which provides a chamber for receiving the dirty water and sediment washed from the magnetite. Each tank constitutes for the extent of its area a resistance territory to the upward movement of the liquid above the bed and is of a width substantially equal to the width of the bed, although its opposite ends fall short of contacting with the adjacent walls, as clearly shown in Fig. 3. Each electromagnet 66 is carried by its tank adjacent to an upwardly extending opening (not shown) up through which the dirty water and sediment will be carried under upward tidal flow to pass over a weir or the like for discharge into the interior of the tank; and it may be remarked in this connection that the overflow edge over which the dirty water and sediment flow to fall into the interior of the tank, is disposed at a level below the outlet openings through which the clear liquor flows into the clear liquor launders, this provision being necessary in order that the dirty water and sediment washed from the filter bed will be carried upwardly by the pressural tide as the latter seeks its level. This arrangement is such that each time an electromagnet is energized the magnetite therebelow will jump up from the screen; and conversely each time the electromagnet is de-energized, the magnetite will fall back upon the screen. Through the intermittent operations of the electromagnets, the magnetite will thus be agitated for the full thickness of the bed, and in this connection also the thumping of the vibrated magnetite upon the screen will cause vibration of the screen itself for effecting the release of any impurities which have become attached thereto. For the full details of the construction and operation of a magnetite cleaning machine of the character illustrated herein, reference may be had to United States Letters Patent No. 1,872,759, granted August 23, 1932, to William C. Laughlin and Abraham B. Asch. It may also be pointed out in this connection that sand may be used as the filtering medium instead of magnetite and in such case the cleaning machine instead of being equipped with an electromagnet, may be furnished with various mechanical devices whereby to effect the agitation and washing of the sand. Examples of suitable sand-cleaning machines are illustrated and described in our applications for Letters Patent of the United States, Serial No. 553,527 filed July 28, 1931, and Serial No. 553,528, filed July 28, 1931.

The carriage 67 may be provided with means whereby to be self-propelled; and in the present embodiment the means for this purpose is represented as comprising an A. C. motor 71 which drives an assembly of reduction gears contained in a reduction gear box 72, with the driven shaft 73 of the reduction gears carrying a gear wheel 74 which is in driving connection with a gear 75 fixed on an axle 76 carrying a pair of track wheels 68. Current may be supplied to the motor 71 through a three-phase system 77 the individual wires of which are connected with brushes 78 supported underneath the carriage by suitable insulation 79. These brushes 78 engage corresponding bus bars 80 which, by means of suitable insulation, are mounted at or near the top of one of the adjacent walls, which wall in the present instance comprises the baffle wall 34.

Within the interior of each of the cleaning tanks 70 is disposed a rotary pump 81 by means of which to pump out the dirty water and sediment which is deposited in the interior of the tank; and connected with each pump is a discharge line 82 which, in the present instance, is extended to the travel-way chamber 35 for discharging into the same so that the dirty water and sediment may be re-circulated for settling. Each pump 81 is driven by a motor 83 having circuit wires 84, 84' extending to the circuit supply wires 85, 85' connected with a D. C. generator 86 which is driven by an A. C. motor 87 having electrical connection with the three-phase supply line 77. For the intermittent operation of the electromagnets, there may be provided a make and break switch 88 one side of which is in electric connection with the wires 85, 85' and the opposite side of which is in electric connection with the electromagnets through the wires 89, 89'. The make and break switch may be operated mechanically by any suitable mechanism, power for which may be obtained from one of the electric motors. The pumps 81 and electromagnets 66 may thus be operated continuously during the travel of the self-propelled carriage. The track rails 69 extend along the full length of the tank 11 so that the filter beds may be cleaned throughout their entire length. The motor 71 from which power is obtained for driving the carriage, should consist of a reversible motor in order that the direction of the movement of the carriage may be reversed at the opposite ends of the tank. The traveling carriage should be moved at a rate that will prevent the filter bed from becoming clogged or from becoming very dirty, for the cleaner the bed is kept the cleaner the clear liquor effluent will be.

The carriage 67 supports and moves scraper means by which the settlings subsiding upon the bottom 22 will be removed into the circular portion 19 of the reception tank to fall upon the bottom 20 thereof. The scraper means for this purpose includes a scraping plate 90 which extends across the width of the chamber 37 closely adjacent the bottom 22. This scraping plate is supported at the lower end of a frame 91 adapted to swing vertically upon a horizontal shaft 92 carried by frame supports 93 depending from the carriage with the travel-way chamber 35. The swing frame 91, at the end thereof opposite the scraper plate 90 is furnished with a counterweight 94, the purpose of which is to balance the swing frame in its non-scraping position as indicated by the broken lines 95 shown in Fig. 2. The swing frame is furnished at or near the horizontal shaft 92 with a laterally projecting arm 96 to which one end of a connecting bar 97 is pivoted, the opposite end of said connecting bar being pivoted to an eccentric member 98 turning upon a stud 99 and toothed to cooperate with a driving gear 100. When the swing frame is in perpendicular or substantially prependicular position for scraping, as shown in full lines in Fig. 2, the eccentric member is in off-center condition and engages a stop 101 whereby to be maintained in such condition. When the eccentric member is swung around so that the swing frame will occupy the broken line position, as shown at 95, a shoulder 102 on the eccentric will engage said stop 101 and this stop in connection with the counterweight 94 will serve to maintain the swing frame in such non-scraping position. The operation of the eccentric is controlled through the driving gear 100 and the shaft carrying this gear is equipped with a cam 103 adapted for its operation to be engaged with the roller devices 104 and 104' located on the baffle wall 34' and at the positions in which it is necessary to effect the swinging of the swing frame. Under this arrangement, as the carriage travels forwardly toward the baffle wall 26 of the reception tank, the swing frame will be in perpendicular position so that the scraper plate will remove the settlings upon the bottom 22 into the reception tank. As soon as the carriage reaches its forward terminal, the cam 103 will impinge the forward roller 104 so as to effect the swinging of the swing frame into its dotted line position 95 which is to be maintained during the reverse movement of the carriage when no scraping is to take place. When the carriage has moved to its rear terminal, the cam 103 will impinge the roller 104' with the result that the swing frame will be swung from the illustrated broken line position to its perpendicular position for again scraping the bottom of the tank during the forward travel of the carriage.

It may be remarked here that, in practice, means may be provided whereby in connection with the swinging of the swing frame, the motor 71 will be reversed, so that each time the traveling carriage moves into a terminal position, its motive power will automatically be reversed so as to operate the carriage in the reverse direction, with the result that the carriage will be caused to travel continuously to and fro along the length of the main tank 11 for cleaning the filter beds simultaneously during the to and fro movements and as well for removing the settlings from the bottom 22 during the forward movement of the carriage. A suitable arrangement whereby automatically to effect the reversing of the driving motor is illustrated and described in our copending application for Letters Patent of the United States, Serial No. 644,020, filed Nov. 23, 1932.

A suitable housing, shelter or station 105 may be located at the outlet manifold 16 for the purpose of containing a supply of chlorine to be used in chlorinating, in a manner well understood in the art, the clear liquor entering this manifold.

It will be evident that the construction of the apparatus hereinbefore set forth is capable of a considerable range and change of modification without in any way departing from the spirit of our invention and we accordingly do not wish to be understood as limiting ourselves in any way to the specific details of construction hereinbefore set forth except as hereinafter claimed.

We claim:—

1. Clarification apparatus having a circular section with a bottom including a sump and having an elongated section with a bottom at a higher elevation than the bottom of the first section, with an open space in the upper portion of the first section communicating with the second section through the bottom thereof, traveling means for moving settlings from the bottom of the second section to fall through said space into the first section, rotary means for moving settlings from the bottom of the first section into said sump, and a filter bed in the second section in spaced relation above the bottom thereof and extending across the open space in the upper portion of the first section.

2. Clarification apparatus having a circular section with a bottom including a sump and having an elongated section with a bottom at a higher elevation than the bottom of the first section, with an open space in the upper portion of the first section communicating with the second section through the bottom thereof, traveling means for moving settlings from the bottom of the second section to fall through said space into the first section, rotary means for moving settlings from the bottom of the first section into said sump, a filter bed in the second section in spaced relation above the bottom thereof and extending across the open space in the upper portion of the first section, means providing a discharge level in spaced relation above the bed, and a filling head feeding downwardly into the first section adapted to maintain a pressural movement of liquid through the sections and bed and to effect overflow at the discharge level.

3. In a clarification system, a circular section, with a bottom including a sump, an elongated section with a bottom at a higher elevation than the bottom of the first section, with an open space in the upper portion of the first section communicating with the second section through the bottom thereof, means traveling along the bottom of the elongated section for sweeping settled matter through said open space into the circular section, rotary means for sweeping settled matter on the bottom of the circular section into said sump, a filling head feeding sewage liquid downwardly into the circular section and adapted to maintain a pressural movement through the circular section and to a liquid level in spaced relation above the bottom of the elevated section, and means for agitating the sewage liquid in said filling head.

4. In clarification apparatus, a filling chamber constituting a head feeding downwardly into a first settling chamber, a second settling chamber in open communication at one end with the first settling chamber above the bottom thereof opposite the position of the head and having a bottom at a higher elevation than the bottom of the first settling chamber, a filter bed in the second settling chamber in spaced relation above the bottom thereof but at a level below the level of said head, traveling means effective below the bed for removing settlings from the bottom of the second chamber and discharging through said open end communication and onto the bottom of the first settling chamber, and operative means effective for removing settlings from the bottom of the first settling chamber.

5. In clarification apparatus, a filling chamber constituting a head feeding downwardly into a first settling chamber, a second settling chamber in open communication at one end with the first settling chamber above the bottom thereof opposite the position of the head and having a bottom at a higher elevation than the bottom of the first settling chamber, baffles dividing the upper portion of the second settling chamber into side chambers separated by a travelway, filter beds in the side chambers disposed at a level below the level of said head, traveling means in said travelway effective below the beds for removing settlings from the bottom of the second chamber and discharging through said open end communicating onto the bottom of the first settling chamber, and operative means effective for removing settlings from the bottom of the first settling chamber.

6. A clarification tank having, in combination, a bottom, side chambers above the bottom separated by a travelway, filter beds located in said side chambers, a traveling carriage upon the tank, cleaning machines within the side chambers carried by the carriage for cleaning the beds, and a scraper device within the travelway carried by the carriage and provided with means for scraping settlings subsiding upon the bottom of the tank.

7. A clarification tank having, in combination, a bottom chamber, side chambers above the bottom separated by a travelway, filter beds located in the side chambers and means providing an overflow level above the filter beds, a traveling carriage upon the tank, cleaning machines within the side chambers carried by the carriage for cleaning the beds, a scraper device within the travelway carried by the carriage and provided with means for moving settlings subsiding in the bottom chamber, and means for creating a pressural flow of fluid in the bottom chamber to pass upwardly in the side chambers and through the filter beds to said outlet level, during the operation of said cleaning machines and scraper device.

8. In a sewage clarification system, two communicating clarification sections having bottoms at upper and lower levels, a filter bed disposed in spaced relation above the upper bottom, means for causing a flow of sewage liquid through the sections and upwardly through the filter bed, means within the space between the upper bottom and filter bed traveling longitudinally thereof for sweeping solids along the upper bottom and onto the lower bottom, separate operating mechanism for sweeping and removing solids from the lower bottom, the sweeping mechanism for both bottoms operating continuously and without agitation of the liquid being clarified to keep such liquid substantially free of settled solids to facilitate rapid sedimentation of settleable solids and hence minimize the quantity of solids which is to be removed by the filter bed.

9. Clarification apparatus including a first section with a bottom and an elongated communicating section with a bottom at a higher elevation than the bottom of the first section, traveling means for moving settlings longitudinally along the bottom of the second section and onto the lower bottom of the first section, elevated spillways for liquid to pass from the second section, and a filter bed in the second section disposed below said spillways and above the bottom and beneath which the traveling means for moving settlings is effective, said filter bed being so arranged that all liquid must pass upwardly therethrough for filtering before passing over the elevated spillways.

10. In a clarification system, a first section with a bottom including a sump, a second section of elongated form having a bottom at a higher elevation than the bottom of the first section, elevated spillways for liquid to pass from the second section, means for causing liquid to flow through the two sections and to rise for discharge at said spillways, a filter bed in the second section disposed below the spillways and spaced a distance above the bottom, said filter bed being so arranged that all liquid must pass upwardly therethrough before discharging at the spillways, traveling means in the second section between the bottom thereof and said bed for moving settlings longitudinally along said bottom and thence onto the bottom of the first section, and means for sweeping settlings on the bottom of the first section into said sump.

WILLIAM C. LAUGHLIN.
ABRAHAM B. ASCH.